(12) United States Patent
Wang et al.

(10) Patent No.: US 12,354,760 B2
(45) Date of Patent: Jul. 8, 2025

(54) METHOD AND EQUIPMENT FOR TRANSPORTING NUCLEAR FUEL OF NUCLEAR POWER PLANT

(71) Applicant: Tsinghua University, Beijing (CN)

(72) Inventors: Jinhua Wang, Beijing (CN); Zuoyi Zhang, Beijing (CN); Yue Li, Beijing (CN); Bin Wu, Beijing (CN); Jiong Guo, Beijing (CN); Fu Li, Beijing (CN); Bing Liu, Beijing (CN); Yujie Dong, Beijing (CN); Haitao Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/920,764

(22) PCT Filed: Apr. 21, 2022

(86) PCT No.: PCT/CN2022/088103
§ 371 (c)(1),
(2) Date: Oct. 21, 2022

(87) PCT Pub. No.: WO2023/035620
PCT Pub. Date: Mar. 16, 2023

(65) Prior Publication Data
US 2024/0221965 A1 Jul. 4, 2024

(30) Foreign Application Priority Data

Sep. 9, 2021 (CN) .......................... 202111057787.1

(51) Int. Cl.
*G21F 5/12* (2006.01)
*G21F 5/14* (2006.01)
(52) U.S. Cl.
CPC . *G21F 5/12* (2013.01); *G21F 5/14* (2013.01)

(58) Field of Classification Search
CPC ..................................... G21F 5/12; G21F 5/14
See application file for complete search history.

(56) References Cited

U.S. PATENT DOCUMENTS

| 4,543,488 A | 9/1985 | Diem |
| 5,995,573 A | 11/1999 | Murray |

(Continued)

FOREIGN PATENT DOCUMENTS

| CA | 2251895 C | 12/2005 |
| CN | 204740872 U | 11/2015 |

(Continued)

OTHER PUBLICATIONS

Office Action received in related Chinese application No. 202111057787.1, mailed Jul. 7, 2023, 8 pages.

(Continued)

*Primary Examiner* — Nicole M Ippolito
(74) *Attorney, Agent, or Firm* — Womble Bond Dickinson (US) LLP

(57) ABSTRACT

Multiple groups of nuclear fuel storage containers can be put into the nuclear fuel transport container provided by the present application as a whole to realize the overall transportation of the multiple groups of storage containers; the transport container has a cubic structure in appearance, which can fully utilize the transportation space and improve the transportation efficiency; an outer side of the transport container is provided with an anti-penetration structure, which can effectively alleviate the collision and penetration damage caused by transportation and hoisting accident, and ensure that the nuclear fuel element can be safely enclosed after the accident; heat insulation material is provided between inner and outer steel plates of the transport container, which can effectively protect the internal storage container and the loaded nuclear fuel element under fire (Continued)

condition, and the heat insulation material also has a function of drop buffer.

20 Claims, 7 Drawing Sheets

(56) References Cited

U.S. PATENT DOCUMENTS

| | | | | |
|---|---|---|---|---|
| 9,824,781 | B2* | 11/2017 | Waisanen | G21C 19/32 |
| 2001/0011711 | A1 | 8/2001 | Nicholson et al. | |
| 2004/0011971 | A1 | 1/2004 | Nicholson et al. | |
| 2006/0188054 | A1* | 8/2006 | Pennington | G21F 5/12 |
| | | | | 376/272 |
| 2013/0045070 | A1* | 2/2013 | Waisanen | G21C 19/00 |
| | | | | 414/572 |
| 2021/0210221 | A1* | 7/2021 | Singh | G21C 5/06 |

FOREIGN PATENT DOCUMENTS

| | | |
|---|---|---|
| CN | 207704875 U | 8/2018 |
| CN | 111916243 A | 11/2020 |
| CN | 112466500 A | 3/2021 |
| KR | 20150022339 A | 3/2015 |

OTHER PUBLICATIONS

Search Report received in related Chinese application No. 202111057787.1, mailed Jul. 6, 2023, 6 pages.

Office Action received in related Canadian application No. 3,178,017, mailed Mar. 25, 2024, 4 pages.

* cited by examiner

METHOD AND EQUIPMENT FOR TRANSPORTING NUCLEAR FUEL OF NUCLEAR POWER PLANT

CROSS-REFERENCE TO RELATED APPLICATIONS

The present application is the National Phase of International Application No. PCT/CN2022/088103 filed on October Apr. 21, 2022, which claims priority to the benefit of Chinese Patent Application no. 202111057787.1 filed Sep. 9, 2021, and the disclosures of which are hereby incorporated herein by reference in their entireties.

TECHNICAL FIELD

The present application relates to the technical field of reactor engineering, in particular to a method and equipment for transporting nuclear fuel of nuclear power plant.

BACKGROUND

At present, nuclear energy plays an important role as one of the clean energy sources being used on a large scale in the world. The application of nuclear energy allows carbon emissions to be effectively reduced and thus sustainable development to be achieved. Nuclear power plant requires much less weight of fuel than coal-fired power plant of the same size, which greatly reduces the transport volume of nuclear fuel or new fuel and minimizes the storage and disposal of nuclear waste after electricity production.

Although the transport volume of new fuel of nuclear power plant is much less than that of coal-fired power plant, the design needs to meet the relevant national standards and other international recognized specifications considering the control of nuclear material and the guarantee of nuclear safety, to ensure, in the process of transport and storage of new fuel, the transport safety of new fuel in both normal operation and accident condition.

The above accident condition includes: accidental fall of the transport container during transporting and hoisting nuclear fuel, high temperature caused by fire, and flooding accident caused by accidental drowning, etc.

China is now actively developing new nuclear power technologies. High temperature gas-cooled reactor, as the fourth-generation nuclear power technology, has widely recognized safety characteristic and development potential. After developing high temperature gas-cooled test reactor, China has built a high temperature gas-cooled reactor demonstration project and studied the nuclear power technology for subsequent commercial promotion of high temperature gas-cooled reactor.

High temperature gas-cooled reactor includes two types, namely pebble bed reactor and prismatic reactor. Pebble bed reactor has got great attention and positive development in China because of its superiority of continuous refueling without shutdown. The fuel element of the pebble bed high temperature gas-cooled reactor has a spherical shape, with graphite as the base, and there are tens of thousands of nuclear fuel particles dispersed inside the nuclear fuel element.

The traditional transport container of nuclear fuel of high temperature gas-cooled reactor has problems of small transport capacity and low efficiency, which is difficult to meet the economic requirements of new fuel transport for the commercial application of high temperature gas-cooled reactor.

SUMMARY

The present application provides equipment for transporting nuclear fuel of nuclear power plant, which can solve the problems of small capacity and low efficiency of traditional nuclear fuel transport container.

The present application provides equipment for transporting nuclear fuel of nuclear power plant, including:

a nuclear fuel transport container, which includes a transport container body and a transport container top cap; where the transport container body includes a transport container frame, a plurality of transport container side plates, a transport container bottom plate, a transport container internal partition plate and a locking member; the transport container frame includes a transport container bottom plate outer frame, a transport container top crossbeam and a plurality of transport container columns; the transport container bottom plate outer frame encloses an outer side of the transport container bottom plate, and the transport container top crossbeam is disposed above the transport container bottom plate outer frame and is connected to the transport container bottom plate outer frame by the plurality of transport container columns; each of the transport container side plates is disposed between two adjacent transport container columns; the transport container side plates, together with the transport container bottom plate, enclose a storage cavity, the transport container top crossbeam encloses an upper opening of the storage cavity, and the upper opening of the storage cavity is provided with a transport container top flange; the transport container internal partition plate, which partitions the storage cavity into a plurality of storage chambers, is disposed in the storage cavity; and the transport container top cap covers the upper opening of the storage cavity and is connected to the transport container top flange by bolts for the transport container top cap; and a plurality of nuclear fuel storage containers, which are placed in corresponding storage chambers of the nuclear fuel transport container; where the locking member is disposed in the storage cavity, and is configured to lock the nuclear fuel storage containers.

According to equipment for transporting nuclear fuel of nuclear power plant provided by the present application, the nuclear fuel storage container includes a storage container body and a storage container top cap; the storage container body includes a storage container frame, a storage container main body and a storage container top flange; a storage compartment is disposed inside the storage container main body, and an upper opening is disposed at a top of the storage container main body; a storage container internal partition plate, which partitions the storage compartment into a plurality of storage compartment units, is provided inside the storage compartment; the storage container frame encloses an outer side of the storage container main body; the storage container top flange is disposed at the upper opening of the storage container main body and is connected to the storage container frame; the storage container top cap covers the upper opening of the storage container main body and is connected to the storage container top flange by bolts for the storage container top cap; a bottom of the storage container top cap is provided with a pressing member which is configured to press a nuclear fuel element tightly; and a top of the storage container frame is provided with a storage container lifting lug which is matched with the locking member in a locking manner.

According to equipment for transporting nuclear fuel of nuclear power plant provided by the present application, the locking member is a storage container pressing bolt disposed at a top of the transport container internal partition plate.

According to equipment for transporting nuclear fuel of nuclear power plant provided by the present application, the nuclear fuel transport container and the nuclear fuel storage container are made of steel.

According to equipment for transporting nuclear fuel of nuclear power plant provided by the present application, the transport container side plate, the transport container bottom plate, the transport container bottom plate outer frame, the transport container top crossbeam, the transport container column and the transport container top cap are filled therein with buffered heat insulation material.

According to equipment for transporting nuclear fuel of nuclear power plant provided by the present application, a top of the transport container top cap is provided with a groove and transport container top cap lifting lugs are provided in the groove.

According to equipment for transporting nuclear fuel of nuclear power plant provided by the present application, each of the transport container bottom plate outer frame and the transport container top crossbeam is provided with a plurality of transport container lock catches.

According to equipment for transporting nuclear fuel of nuclear power plant provided by the present application, outer surfaces of the transport container side plate and transport container bottom plate are provided with transport container reinforcing ribs.

According to a method for transporting nuclear fuel of nuclear power plant provided by the present application, the loading operation of the nuclear fuel before transporting includes the following steps:
  loosening bolts for storage container top cap;
  removing a storage container top cap from an upper opening of a nuclear fuel storage container by hoisting equipment;
  loading a nuclear fuel element into a storage compartment of the nuclear fuel storage container by a loading machine;
  placing the storage container top cap on the upper opening of the nuclear fuel storage container by hoisting equipment;
  tightening the bolts for storage container top cap;
  loosening bolts for transport container top cap;
  removing the transport container top cap from the upper opening of the nuclear fuel transport container by hoisting equipment;
  placing the nuclear fuel storage container into a storage cavity of the nuclear fuel transport container by hoisting equipment;
  locking the nuclear fuel storage container by a locking member;
  placing the transport container top cap on the upper opening of the nuclear fuel transport container by the hoisting equipment; and
  tightening the bolts for the transport container top cap.

According to a method for transporting nuclear fuel of nuclear power plant provided by the present application, the unloading operation of the nuclear fuel after transporting includes the following steps:
  loosening bolts for transport container top cap;
  removing a transport container top cap from an upper opening of a nuclear fuel transport container by hoisting equipment;
  releasing a locking of a nuclear fuel storage container by the locking member;
  removing the nuclear fuel storage container from the upper opening of the nuclear fuel transport container by hoisting equipment;
  loosening bolts for storage container top cap;
  removing the storage container top cap from the upper opening of the nuclear fuel storage container by hoisting equipment;
  unloading a nuclear fuel element from the nuclear fuel storage container by an unloading machine;
  placing the storage container top cap on the upper opening of the nuclear fuel storage container by hoisting equipment;
  tightening bolts for the storage container top cap;
  placing the nuclear fuel storage container into a storage cavity of the nuclear fuel transport container by the hoisting equipment;
  locking the nuclear fuel storage container by the locking member;
  placing the transport container top cap on the upper opening of the nuclear fuel transport container by hoisting equipment; and
  tightening bolts for the transport container top cap.

In the equipment and method for transporting nuclear fuel of nuclear power plant provided by the present application, by placing a plurality of nuclear fuel storage containers into the storage cavity of the nuclear fuel transport container, and locking the nuclear fuel storage containers by the locking member, an overall transportation of the plurality of nuclear fuel storage containers can be realized, which improves not only transportation efficiency of nuclear fuel element, but also stability and safety during transporting the nuclear fuel element.

BRIEF DESCRIPTION OF DRAWINGS

In order to more clearly illustrate the technical solutions according to the present application or the related art, the accompanying drawings required to be used in the description of the embodiments or the related art will be briefly introduced as follows. It should be noted that the drawings in the following description are part of embodiments of the present application, and for those skilled in the art, other drawings or embodiments can be obtained based on these drawings without creative efforts

Figure 1:
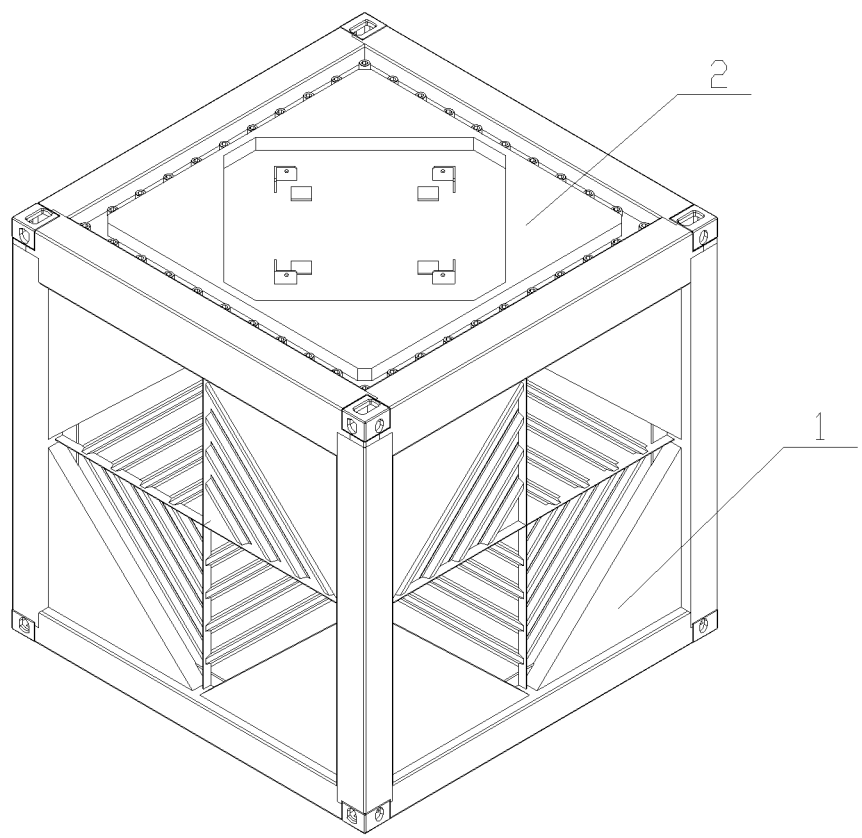
FIG. 1 is a schematic diagram showing stereoscopic structure of equipment for transporting nuclear fuel of nuclear power plant provided by the present application.
Figure 2:
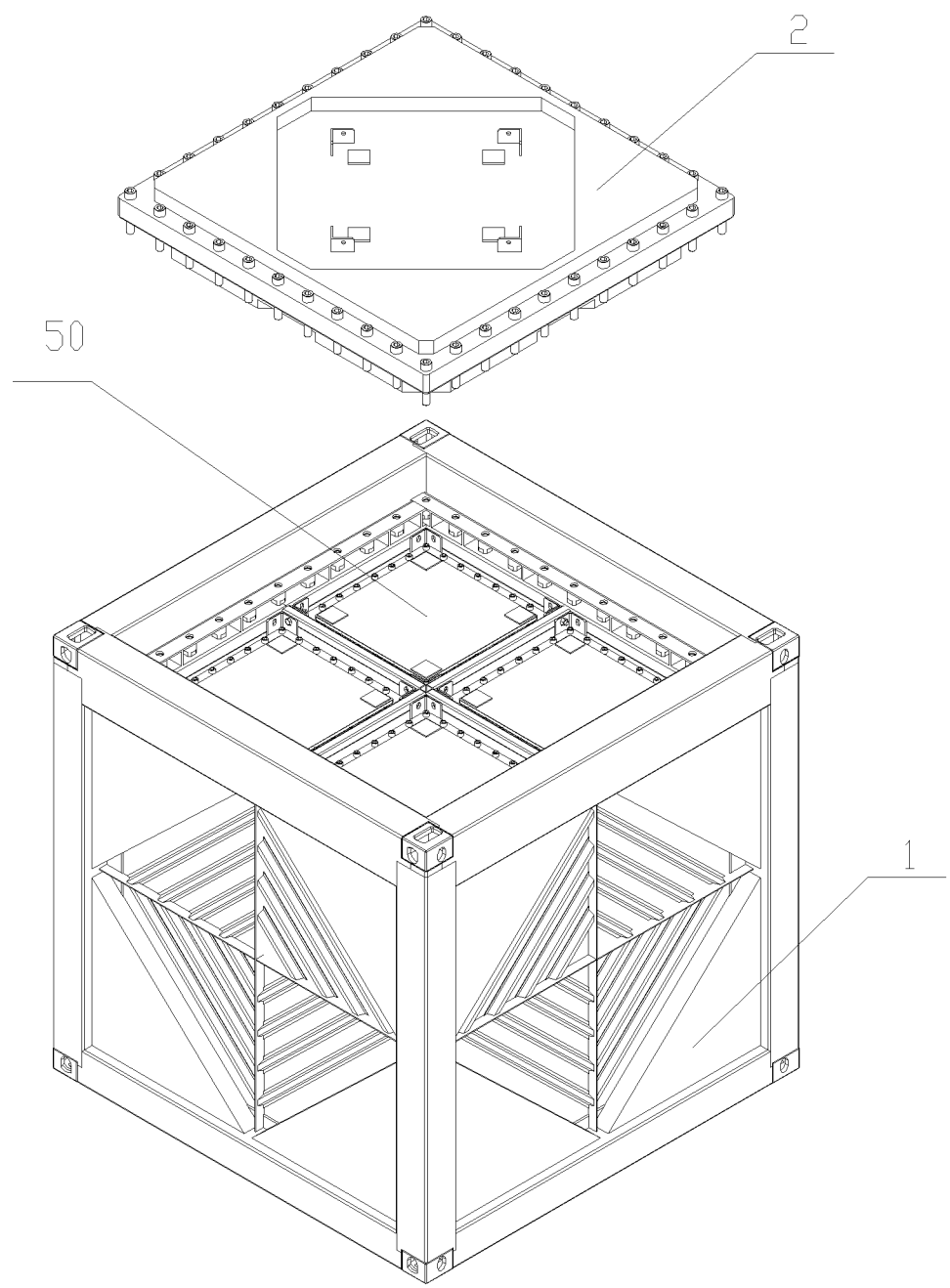
FIG. 2 is a schematic diagram showing stereoscopic structure of equipment for transporting nuclear fuel of nuclear power plant, where a transport container top cap is in an open state according to the present application.
Figure 3:
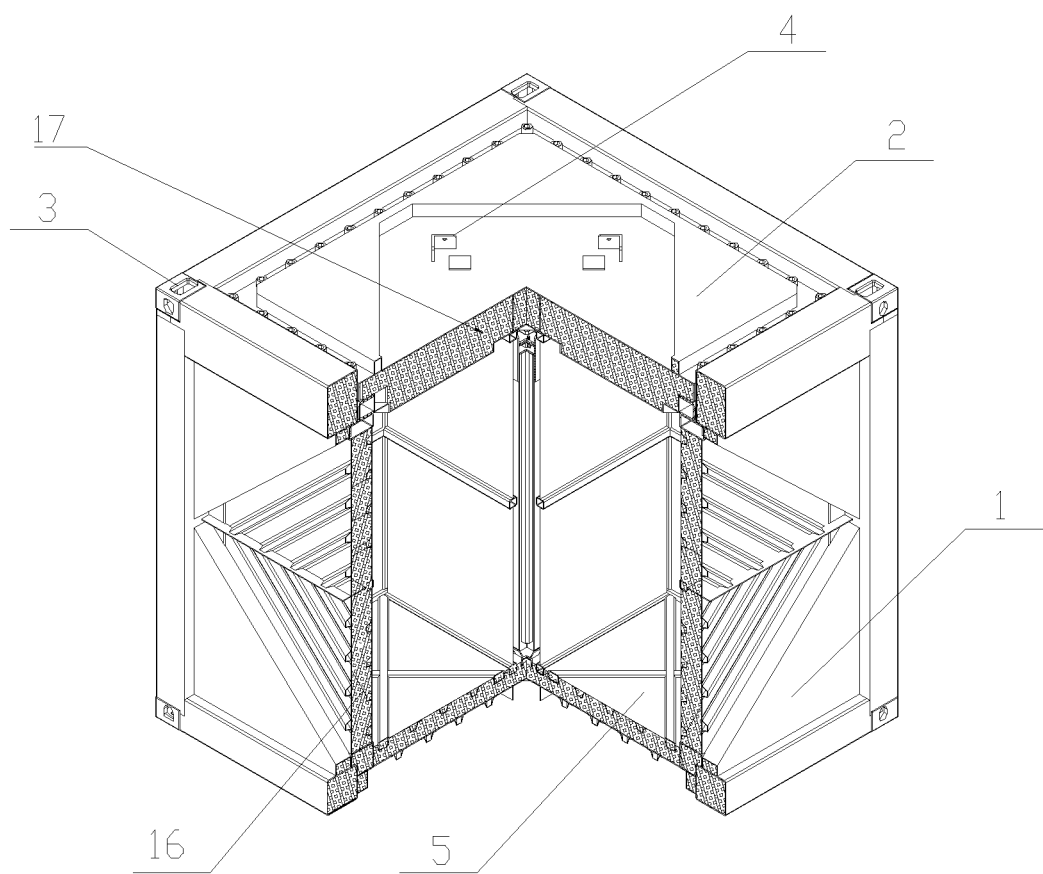
FIG. 3 is a schematic diagram showing sectional structure of equipment for transporting nuclear fuel of nuclear power plant provided by the present application.
Figure 4:
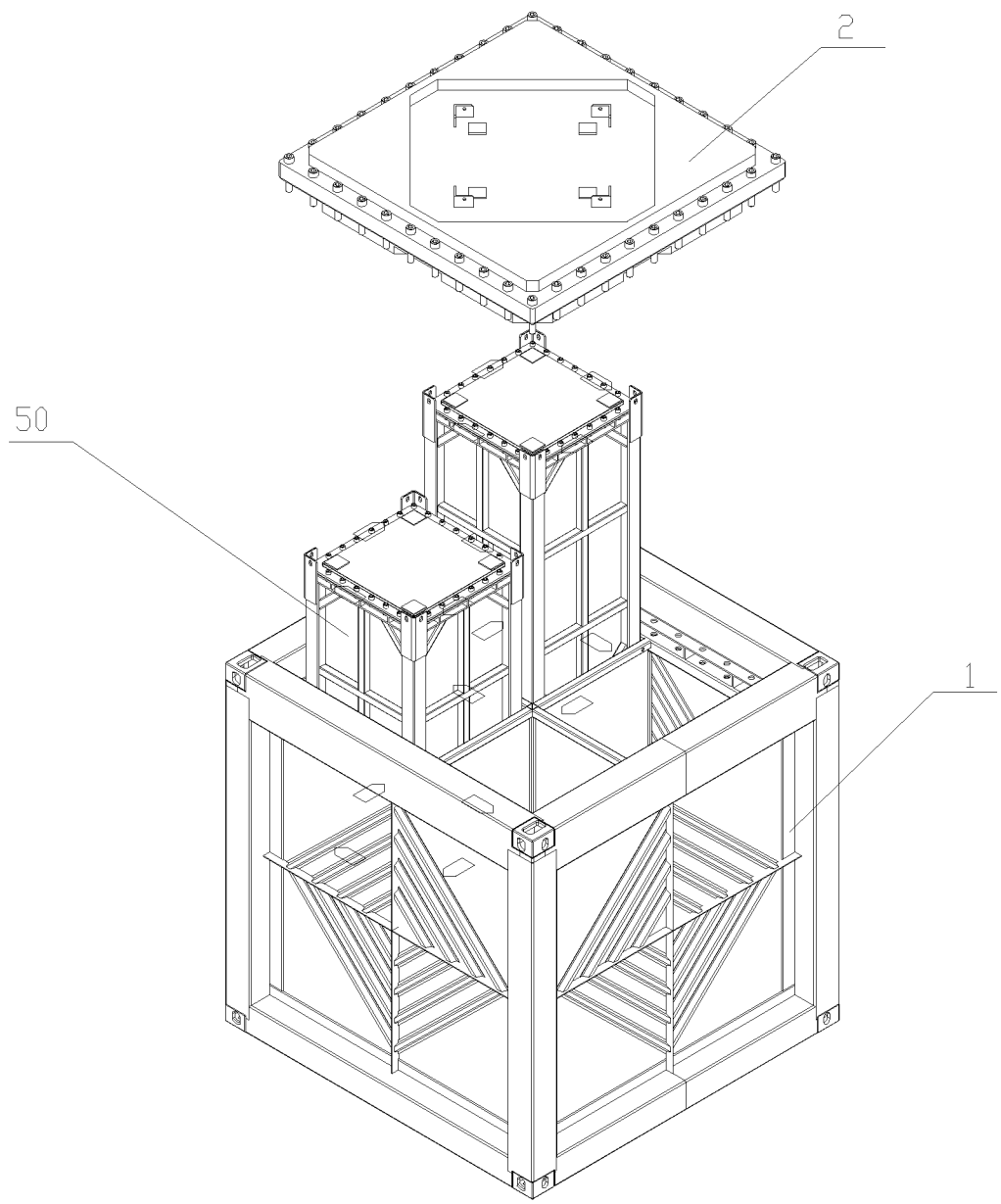
FIG. 4 is a schematic diagram showing exploded structure of equipment for transporting nuclear fuel of nuclear power plant according to the present application.
Figure 5:
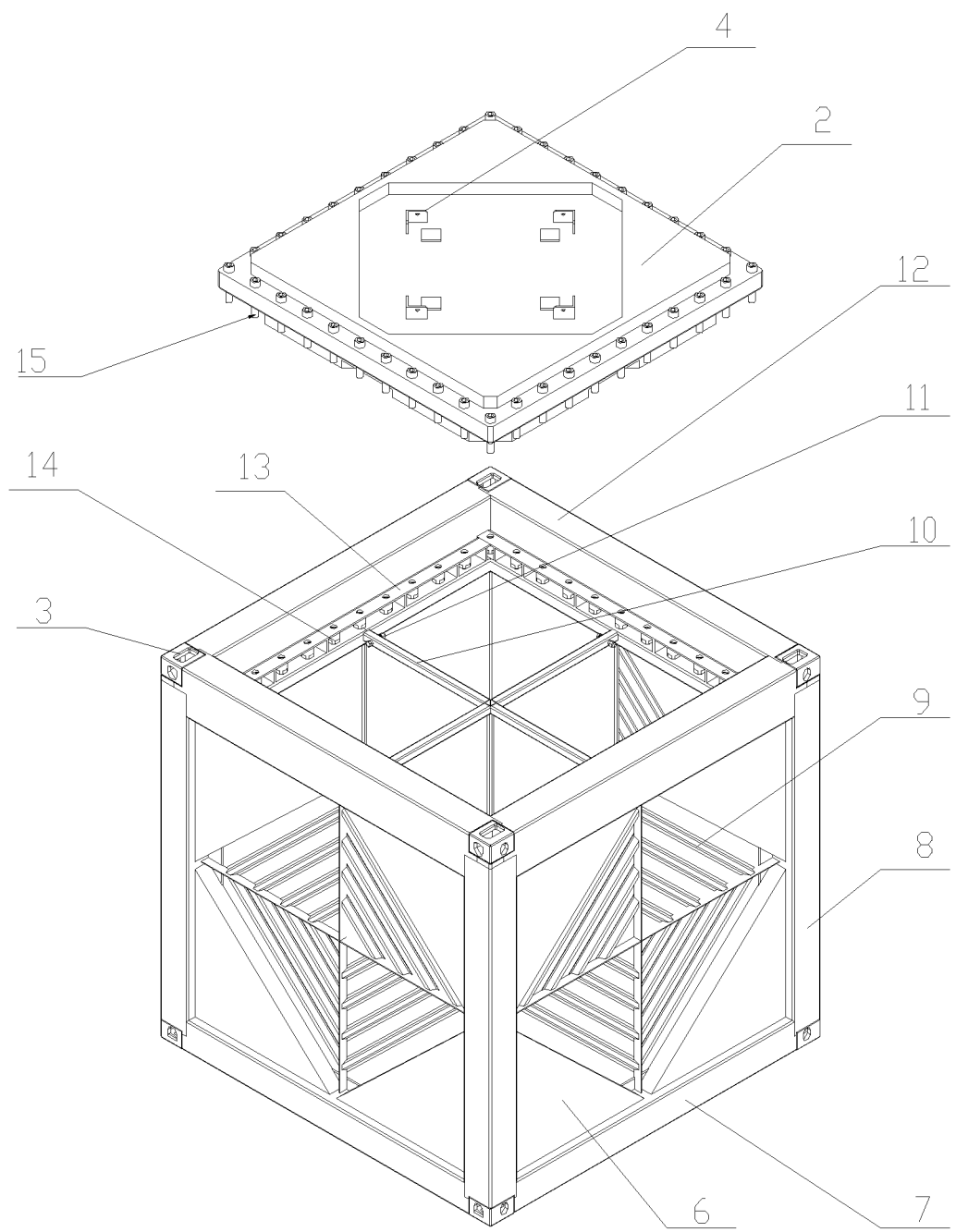
FIG. 5 is a schematic diagram showing structure of equipment for transporting nuclear fuel of nuclear power plant where a nuclear fuel storage container has been removed according to the present application.

Reference numerals: 1-transport container body; 2-transport container top cap; 3-transport container lock catch; 4-transport container top cap lifting lug; 5-transport container bottom plate; 6-transport container side plate; 7-transport container bottom plate outer frame; 8-transport container column; 9-transport container reinforcing rib; 10-transport container internal partition plate; 11-storage container pressing bolt; 12-transport container top crossbeam; 13-transport container top flange; 14-transport container fastening nut; 15-bolts for transport container top cap; 16-buffered heat insulation layer of transport container body; 17-buffered heat insulation layer of transport container top cap; 50-nuclear fuel storage container; 51-storage container body; 52-storage container top cap; 53-storage container bottom plate; 54-reinforcing ribs for storage container bottom plate; 55-storage container bottom plate outer frame; 56-storage container column; 57-storage container side plate; 58-reinforcing rib of storage container side plate; 59-storage container lifting lug; 60-storage container top flange; 61-storage container internal partition plate; 62-nuclear fuel element; 63-bolts for storage container top cap; 64-top cap lifting ring screw seat.

DETAILED DESCRIPTION OF THE EMBODIMENTS

The implementations of the present application are further described in detail below in conjunction with the accompanying drawings and embodiments. The following embodiments are intended to illustrate the present application, but are not intended to limit the scope of the present application.

In the description of the embodiments of the present application, it should be noted that the orientation or positional relations indicated by terms such as "center," "longitudinal," "transverse," "upper," "lower," "front," "rear," "left," "right," "vertical," "horizontal," "top," "bottom," "inner," "outer" and the like are based on the orientation or positional relations shown in the drawings, which are merely for the convenience of description of the embodiments of the present application and simplifying description, but does not indicate or imply that the indicated device or element must have the particular orientation, or be constructed and operated in a particular orientation, and thus it is not to be construed as limiting the embodiments of the present application. Furthermore, the terms "first," "second" and "third" are used for descriptive purposes only and should not be construed as indicating or implying a relative importance.

In the description of the embodiments of the present application, it should be noted that unless explicitly stated and defined otherwise, the terms "connected to" and "connected" shall be understood broadly, for example, it may be either fixedly connected or detachably connected, or can be integrated; it may be either mechanically connected, or electrically connected; it may be either directly connected or indirectly connected through an intermediate medium. The specific meanings of the terms above in the embodiments of the present application can be understood by a person skilled in the art in accordance with specific conditions.

In the embodiments of the present application, unless explicitly stated and defined otherwise, a first feature being "above" or "below" a second feature may mean that the first feature is directly contacted with the second feature, or the first feature and the second feature are indirectly contacted through an intermediate medium. Also, a first feature being "above," "over" and "on" a second feature may mean that the first feature is directly above or obliquely above the second feature, or simply means that a level of the first feature is higher than that of the second feature. A first feature being "below," "under" and "beneath" a second feature may mean that the first feature is directly below or obliquely below the second feature, or simply means that a level of the first feature is lower than that of the second feature.

In the description of this specification, the reference terms such as "one embodiment," "some embodiments," "example," "specific example," "some examples" and the like means that specific feature, structure, material or characteristic described in conjunction with the embodiment or example is included in at least one embodiment or example of the present application. In this description, schematic expressions of the above terms are not necessarily directed to the same embodiment or example. Furthermore, the described specific feature, structure, material or characteristic can be combined in any suitable manner in any one or more embodiments or examples. In addition, those skilled in the art can combine various embodiments or examples and features in various embodiments or examples described in this description unless they are contradictory.

A method and equipment for transporting nuclear fuel of nuclear power plant are described below in conjunction with FIGS. 1-7.

As shown in FIGS. 1-5, the present application provides equipment for transporting nuclear fuel of nuclear power plant. The equipment includes a nuclear fuel transport container and a plurality of nuclear fuel storage containers 50. The nuclear fuel transport container includes a transport container body 1 and a transport container top cap 2. The transport container body 1 includes a transport container frame, a plurality of transport container side plates 6, a transport container bottom plate 5, a transport container internal partition plate 10 and a locking member. The transport container frame includes a transport container bottom plate outer frame 7, a transport container top crossbeam 12 and a plurality of transport container columns 8. The transport container bottom plate outer frame 7 encloses an outer side of the transport container bottom plate 5, and the transport container top crossbeam 12 is disposed above the transport container bottom plate outer frame 7 and is connected to the transport container bottom plate outer frame 7 by the plurality of transport container columns 8. Each of the transport container side plates 6 is disposed between two adjacent transport container columns 8. The transport container side plates 6, together with the transport container bottom plate 5 enclose a storage cavity, the transport container top crossbeam 12 encloses an upper opening of the storage cavity, and the upper opening of the storage cavity is provided with a transport container top flange 13. The transport container internal partition plate 10 is disposed in the storage cavity and configured to partition the storage cavity into a plurality of storage chambers. The transport container top cap 2 covers the upper opening of the storage cavity and is connected to the transport container top flange 13 by bolts for the transport container top cap 15.

The nuclear fuel storage container 50 can be placed into the storage chambers of the nuclear fuel transport container, and the locking member is disposed above the storage cavity and is configured to lock the nuclear fuel storage container 50.

In the equipment for transporting nuclear fuel of nuclear power plant provided by the present application, by placing a plurality of nuclear fuel storage containers 50 into the nuclear fuel transport container, and tightly locking and pressing the nuclear fuel storage containers 50 by the locking member, an overall transportation of the plurality of nuclear fuel storage containers 50 can be realized, which improves not only transportation efficiency of nuclear fuel element 62, but also stability and safety during transporting the nuclear fuel element 62.

According to embodiments of the present application, the transport container body 1 is cubic in shape, and the transport container body 1 having cube structure can maximize the utilization of space of storage and transport, and increase a transport volume of the nuclear fuel element 62. The nuclear fuel storage container 50 is cubic in shape, and the nuclear fuel storage container 50 having cube structure can maximize the utilization of storage space, increase a transport volume of the nuclear fuel element 62, and realize a regular loading and storage of the nuclear fuel element 62. For example, in an embodiment of the present application, the transport container internal partition plate 10 partitions the storage cavity into four storage chambers, and the fuel storage container 50 can be placed in each of the four storage chambers.

It should be noted here that the shape of the transport container body 1 is not limited to cube, and it can be regular polyhedron or other shapes. The shape of the storage container body 51 is also not limited to cube, and the shape of the storage container body 51 matches with a shape of the storage chamber.

Figure 6:
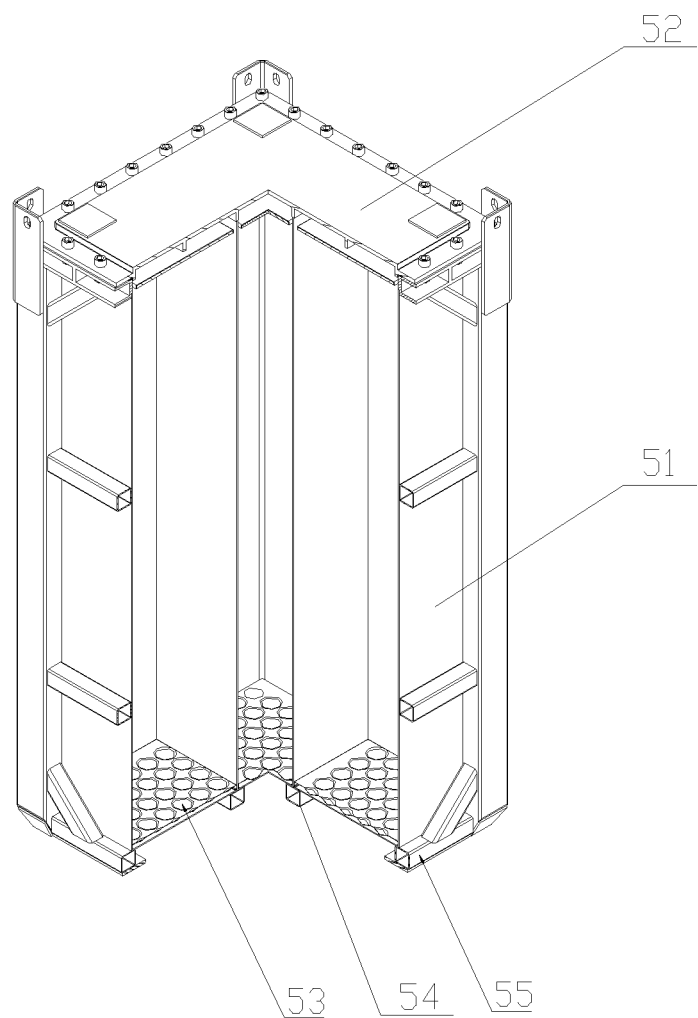
FIG. 6 is a schematic diagram showing sectional structure of a nuclear fuel storage container according to the present application.
Figure 7:
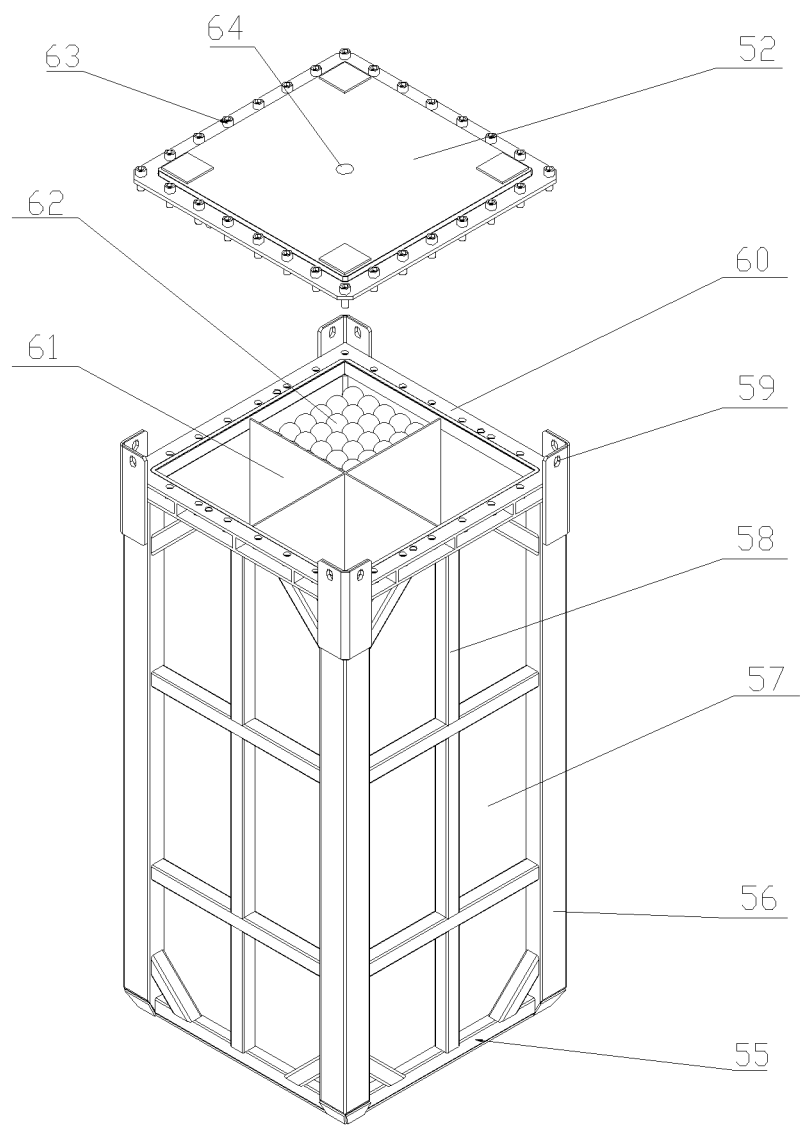
FIG. 7 is a schematic diagram showing stereoscopic structure of a nuclear fuel storage container, where a top cap is in an open state according to the present application.

As shown in FIGS. 6-7, according to the embodiments of the present application, the nuclear fuel storage container 50 includes a storage container body 51 and a storage container top cap 52. The storage container body 51 includes a storage container frame, a storage container main body and a storage container top flange 60. The storage container bottom plate 53 and the storage container side plates 57 enclose the storage container main body. A storage compartment is formed inside the storage container main body, and an upper opening is formed at a top of the storage container main body. a storage container internal partition plate 61 which partitions the storage compartment into a plurality of storage compartment units is provided inside the storage compartment. The storage container frame is composed of a storage container bottom plate outer frame 55 and storage container columns 56, a lower end of the storage container column 56 is connected to the storage container bottom plate outer frame 55, and the storage container frame encloses an outer side of the storage container main body. The storage container top flange 60 is disposed at the upper opening of the storage container main body and is connected to an upper end of the storage container column 56. The storage container top cap 52 covers the upper opening of the storage container main body and is connected to the storage container top flange 60 by bolts for storage container top cap 63. A bottom of the storage container top cap 52 is provided with a pressing member which is configured to press the nuclear fuel element 62 tightly. The pressing member can be a spring pressing plate or a soft gasket. By providing the pressing member, the nuclear fuel element 62 is pressed tightly within a size change range, and the integrity of the nuclear fuel element 62 is ensured.

A top of the storage container frame is provided with a storage container lifting lug 59 which is matched with the locking member in a locking manner. The number of the storage container lifting lugs 59 is four, and the four storage container lifting lugs 59 are disposed at four corners of the top of the storage container frame. By providing the storage container lifting lugs 59, it facilitates the nuclear fuel storage container 50 to be grabbed by hoisting equipment, and to be locked by the locking member.

According to the embodiments of the present application, the locking member is a storage container pressing bolt 11 which is disposed at a top of the transport container internal partition plate 10. The top of the transport container internal partition plate 10 is provided with a through hole, in which the storage container pressing bolt 11 is installed. When the nuclear fuel storage container 50 is locked, the storage container pressing bolt 11 only needs to be connected to the storage container lifting lug 59.

According to the embodiments of the present application, the transport container side plate 6, transport container bottom plate 5, transport container bottom plate outer frame 7, transport container top crossbeam 12 and transport container column 8 are filled therein with buffered heat insulation material. For example, the buffered heat insulation materials inside the transport container side plate 6, the transport container bottom plate 5, the transport container bottom plate outer frame 7, the transport container top crossbeam 12 and the transport container columns 8 is referred to as a buffered heat insulation layer of transport container body 16. The transport container top cap 2 also can be filled therein with buffered heat insulation material, for example, the buffered heat insulation material inside the transport container top cap 2 is referred to as a buffered heat insulation layer of transport container top cap 17. By filling the buffered heat insulation material, the inside nuclear fuel storage container 50 and the loaded nuclear fuel element 62 can be effectively protected under a fire condition. In addition, the buffered heat insulation material can effectively buffer a collision caused by a transportation accident or a hoisting accident, through which a function of drop buffering is achieved, thereby improving safety of the equipment for transporting nuclear fuel of nuclear power plant.

According to the embodiments of the present application, the nuclear fuel transport container and the nuclear fuel storage container 50 are made of steel. Steel, as a structural material, is also a neutron absorption material, and has advantages of easy processing and low cost.

According to the embodiments of the present application, a top of the transport container top cap 2 is provided with a groove and transport container top cap lifting lugs 4 is provided in the groove. By providing the transport container top cap lifting lugs 4, it is convenient to hoist the top cap of the nuclear fuel transport container and realize a remote manual or automatic hoisting operation. By providing the groove, it can be ensured that the top of the transport container top cap 2 is flat, which can facilitate the stacking and storage of the nuclear fuel transport container.

According to the embodiments of the present application, each of the transport container bottom plate outer frame 7 and the transport container top crossbeam 12 is provided with a plurality of transport container lock catches 3. In an embodiment, the transport container bottom plate outer frame 7 and the transport container top crossbeam 12 are respectively provided with four transport container lock catches 3. For example, four transport container lock catches 3 are disposed at four corners of the transport container bottom plate outer frame 7, and four transport container lock catches 3 are disposed at four corners of the transport container top crossbeam 12, that is, the lock catches 3 are disposed at eight vertex corners of the transport container body 1. By providing the transport container lock catches 3, the nuclear fuel transport container can be fixed on a vehicle board or a support platform conveniently and reliably, and the stacking storage and fixing of a plurality of transport containers can be realized.

According to the embodiments of the present application, outer surfaces of the transport container side plate 6 and transport container bottom plate 5 are provided with transport container reinforcing ribs 9. By providing the transport container reinforcing ribs 9, the collision and penetration damage from multiple directions caused by a transportation accident or a hoisting accident can be effectively alleviated, and the safety of the nuclear fuel element 62 is ensured. There are multiple arrangements of the transport container reinforcing ribs 9, and the specific arrangement can be adjusted according to a mechanical analysis or a test result.

As shown in FIGS. 1-7, according to the embodiments of the present application, the equipment for transporting nuclear fuel of nuclear power plant includes the nuclear fuel transport container and the nuclear fuel storage container 50, the nuclear fuel transport container includes the transport container body 1 and the transport container top cap 2, and both the nuclear fuel transport container and the nuclear fuel storage container 50 are cubic in shape.

The transport container body 1 includes the transport container frame, four transport container side plates 6, the transport container bottom plate 5, the transport container internal partition plate 10 and the locking member. The transport container frame includes the transport container bottom plate outer frame 7, transport container top crossbeam 12 and four transport container columns 8. Each of the transport container side plate 6 and the transport container bottom plate 5 is a rectangular plate, and outer surfaces of both the transport container side plate 6 and the transport container bottom plate 5 are provided with the transport container reinforcing ribs 9. The transport container bottom plate outer frame 7 encloses an outer side of the transport container bottom plate 5, and the transport container top crossbeam 12 is disposed above the transport container bottom plate outer frame 7 and is connected to the transport container bottom plate outer frame 7 by the four transport container columns 8. The container bottom plate outer frame 7 and the transport container top crossbeam 12 are respectively provided with four transport container lock catches 3. Four transport container lock catches 3 are disposed at four corners of the container bottom plate outer frame 7, and four transport container lock catches 3 are disposed at four corners of the transport container top crossbeam 12.

Each of the transport container side plates 6 is disposed between two adjacent transport container columns 8, and the transport container side plates 6, together with the transport container bottom plate 5, enclose the storage cavity. The transport container top crossbeam 12 encloses the upper opening of the storage cavity. The upper opening of the storage cavity is provided with the transport container top flange 13, and the transport container top flange 13 is located at an inner side of the transport container top crossbeam 12. The transport container top flange 13 is provided with a plurality of bolt holes in which transport container fastening nuts 14 can be installed. The transport container side plate 6, the transport container bottom plate 5, the transport container bottom plate outer frame 7, the transport container top crossbeam 12, the transport container column 8 and the transport container top cap 2 are filled therein with buffered heat insulation material. The transport container internal partition plates 10 are disposed in the storage cavity and configured to partition the storage cavity into four storage chambers in which the nuclear fuel storage containers can be placed.

The top of the transport container top cap 2 is provided with a groove and transport container top cap lifting lugs 4 are provided in the groove. The transport container top cap 2 covers the upper opening of the storage cavity and is connected to the transport container top flange 13 by bolts for transport container top cap 15. The locking member is the storage container pressing bolt 11 which is disposed at the top of the transport container internal partition plate 10. The nuclear fuel transport container and the nuclear fuel storage container 50 are made of steel.

The nuclear fuel storage container 50 is disposed inside a corresponding storage chamber and includes the storage container body 51 and the storage container top cap 52. The storage container body 51 includes the storage container frame, a storage container main body and the storage container top flange 60. The storage container bottom plate 53 and the storage container side plates 57 enclose the storage container main body. A storage compartment is disposed inside the storage container main body, and an upper opening is disposed at the top of the storage container main body. The storage container internal partition plate 61 which partitions the storage compartment into four storage compartment units is provided inside the storage compartment. The four storage compartment units are loaded with nuclear fuel elements 62. The storage container frame encloses an outer side of the storage container main body and is connected to an upper end of the storage container column 56 by welding. A bottom of the storage container main body is provided with reinforcing ribs of storage container bottom plate 54, and a side wall of the storage container main body is provided with reinforcing ribs of storage container side plate 58. The arrangements of the reinforcing ribs of storage container side plate 58 and the reinforcing ribs of storage container bottom plate 54 can be adjusted according to a mechanical analysis or a test result.

The storage container top flange 60 is disposed at the upper opening of the storage container main body and is connected to the storage container frame. The storage container top flange 60 is provided with a plurality of bolt holes, and the storage container fastening nut is provided below the bolt holes. The storage container top cap 52 covers the upper opening of the storage container main body and is connected to the storage container top flange 60 by bolts for the storage container top cap 63. A top of the storage container top cap 52 is provided with a top cap lifting ring screw seat 64. When it is needed to hoist and load the storage container top cap 52, a lifting ring screw can be screwed into the top cap lifting ring screw seat 64, and a protection plug can be rotated into the top cap lifting ring screw seat 64 to protect the top cap lifting ring screw seat 64 in a normal operation condition. The bottom of the storage container top cap 52 is provided with the pressing member which is configured to press the nuclear fuel element 62 tightly. The pressing member can be a spring pressing plate or a soft gasket. By providing the pressing member, it can be realized that the nuclear fuel element 62 is pressed tightly within a size change range to protect the integrity of the nuclear fuel element 62. The top of the storage container frame is provided with the storage container lifting lug 59 which is matched with the locking member in a locking manner. The number of the storage container lifting lugs 59 is four, and the four storage container lifting lugs 59 are disposed at four corners of the top of the storage container frame.

Further provided is a method for transporting nuclear fuel of nuclear power plant, which is an operation for loading the nuclear fuel. The method includes the following steps.

Step 101, loosening the bolts for storage container top cap 63.

Before the nuclear fuel storage container 50 is opened, the nuclear fuel storage container 50 should be placed on an operating platform such as the ground or the vehicle board to ensure that the nuclear fuel storage container 50 has good stability. After the nuclear fuel storage container 50 is placed stably, the bolts for storage container top cap 63 can be loosened and the storage container top cap 52 can be separated from the storage container top flange 60.

Step 102, removing the storage container top cap 52 from the upper opening of the nuclear fuel storage container 50 by hoisting equipment.

The hoisting equipment can remove the storage container top cap 52 disposed on the upper opening of the nuclear fuel storage container 50 in at least the following schemes:
- a first scheme in which the hoisting equipment cooperates with the lifting ring screw, and before the storage container top cap 52 is hoisted, the lifting ring screw should be screwed into the top cap lifting ring screw seat 64, and then the hoisting equipment grabs the lifting ring screw to remove the storage container top cap 52 disposed on the upper opening of the nuclear fuel storage container 50; and
- a second scheme in which the hoisting equipment is a suction cup type hoisting equipment which can directly suck the storage container top cap 52, and then remove the storage container top cap 52 disposed on the upper opening of the nuclear fuel storage container 50.

Step 103, loading a nuclear fuel element 62 into the storage compartment of the nuclear fuel storage container 50 by a loading machine.

The nuclear fuel element 62 is the nuclear fuel. The nuclear fuel element 62 can be loaded into the storage compartment of the nuclear fuel storage container 50 by the loading machine, which can effectively improve the operation efficiency.

Step 104, placing the storage container top cap 52 on the upper opening of the nuclear fuel storage container 50 by the hoisting equipment.

Step 105, tightening the storage container top cap bolt 63.

After the storage container top cap bolt 63 is tightened, the storage container top cap 52 is connected to the storage container top flange 60 by the bolts for storage container top cap 63. At this time, the pressing member presses the nuclear fuel element 62 tightly to realize that the nuclear fuel element 62 is pressed tightly within a size change range and the integrity of the nuclear fuel element 62 is ensured.

The above steps 101 to 105 are a process of placing the nuclear fuel element 62 into the nuclear fuel storage container 50.

Step 106, loosening the bolts for transport container top cap 15.

Before the nuclear fuel transport container is opened, the nuclear fuel transport container should be placed on an operating platform such as the ground or the vehicle board to ensure that the nuclear fuel transport container has good stability. After the nuclear fuel transport container is placed stably, the transport container top cap bolt 15 is loosened and the transport container top cap 2 can be separated from the transport container top flange 13.

Step 107, removing the transport container top cap 2 from the upper opening of the nuclear fuel transport container by the hoisting equipment.

During the transport container top cap 2 is hoisted, the hoisting equipment grabs the transport container top cap lifting lugs 4 on the transport container top cap 2 and removes the transport container top cap 2 from the upper opening of the nuclear fuel transport container. It should be noted that the way of hoisting the transport container top cap 2 by hoisting equipment is not limited to this, and the transport container top cap 2 can be hoisted by lifting ring screw or suction cup.

Step 108, placing the nuclear fuel storage container 50 into the storage cavity of the nuclear fuel transport container by the hoisting equipment.

Before placing the nuclear fuel storage container 50 into the storage cavity of the nuclear fuel transport container, the locking member, that is, the storage container pressing bolt 11, needs to be opened and the hoisting equipment places the nuclear fuel storage container 50 into the storage cavity of the nuclear fuel transport container by grabbing the storage container lifting lug 59.

Step 109, locking the nuclear fuel storage container 50 by the locking member.

After the nuclear fuel storage container 50 is placed into the storage cavity of the nuclear fuel transport container, the nuclear fuel storage container 50 can be locked by the locking member to prevent the nuclear fuel storage container 50 from moving during transportation, thereby improving the stability and safety of the transportation of the nuclear fuel element 62.

Step 110, placing the transport container top cap 2 on the upper opening of the nuclear fuel transport container by the hoisting equipment.

Step 111, tightening the bolts for transport container top cap 15.

It should be noted here that the above steps 106 to 111 are the process of placing the nuclear fuel storage container 50 into the nuclear fuel transport container, and the transport platform can be a car, train, ship or other means of transport.

According to the embodiments of the present application, the method for transporting nuclear fuel of nuclear power plant further includes:
- step 112, fixing the nuclear fuel transport container to a car, train, ship or other means of transport by the transport container lock catches 3.

The transport container lock catches 3 can facilitate the fixation of the nuclear fuel transport container and improve the stability of the nuclear fuel transport container during the transportation.

The present application further provides a method for transporting nuclear fuel of nuclear power plant, which is an operation of unloading the nuclear fuel. The method includes the following steps:
- step 201, loosening bolts for transport container top cap 15;
- step 202, removing a transport container top cap 2 from an upper opening of the nuclear fuel transport container by the hoisting equipment;
- step 203, releasing a locking of the nuclear fuel storage container 50 by the locking member;
- step 204, removing the nuclear fuel storage container 50 through the upper opening of the nuclear fuel transport container by the hoisting equipment.

It should be noted here that the above steps 201-204 are the process of removing the nuclear fuel storage container 50 from the nuclear fuel transport container, which is a reverse process to the process of placing the nuclear fuel storage container 50 into the nuclear fuel transport container in the previous embodiments.

Step 205, loosening bolt for storage container top cap 63;

step 206, removing the storage container top cap 52 from the upper opening of the nuclear fuel storage container 50 by the hoisting equipment;

step 207, unloading the nuclear fuel element 62 from the nuclear fuel storage container 50 by an unloading machine.

In this embodiment, the nuclear fuel element 62 in the nuclear fuel storage container 50 is unloaded by the unloading machine; alternatively, the nuclear fuel element 62 can be dumped out directly, or can be taken out by other methods.

The above steps 205-207 are the process of removing the nuclear fuel element 62 from the nuclear fuel storage container 50, which is a reverse process to the process of placing the nuclear fuel element 62 into the nuclear fuel storage container 50.

Step 208, placing the storage container top cap 52 on the upper opening of the nuclear fuel storage container 50 by the hoisting equipment;

step 209, tightening the bolts for storage container top cap 63;

step 210, placing the storage container 50 into the storage cavity of the nuclear fuel transport container by the hoisting equipment;

step 211, locking the nuclear fuel storage container 50 by the locking member;

step 212, placing the transport container top cap 2 on an upper opening of the nuclear fuel transport container by the hoisting equipment; and step 213, tightening the bolts for transport container top cap 15.

Finally, it should be noted that the above embodiments are only used to illustrate the technical solutions of the present application, but not to limit it. Although the present application has been described in detail with reference to the embodiments, those of ordinary skill in the art should understand that they can still modify the technical solutions recorded in the foregoing embodiments, or make equivalent replacement for some of the technical features. These modifications or replacements do not make the essence of the corresponding technical solution depart from the scope of the technical solutions of the embodiments of the present application.

What is claimed is:

1. Equipment for transporting nuclear fuel of nuclear power plant, comprising:
 a nuclear fuel transport container, which comprises a transport container body and a transport container top cap; wherein the transport container body comprises a transport container frame, a plurality of transport container side plates, a transport container bottom plate, a transport container internal partition plate and a locking member; the transport container frame comprises a transport container bottom plate outer frame, a transport container top crossbeam and a plurality of transport container columns; the transport container bottom plate outer frame encloses an outer side of the transport container bottom plate, and the transport container top crossbeam is disposed above the transport container bottom plate outer frame and is connected to the transport container bottom plate outer frame by the plurality of transport container columns; each of the transport container side plates is disposed between two adjacent transport container columns; the transport container side plates, together with the transport container bottom plate, enclose a storage cavity, the transport container top crossbeam encloses an upper opening of the storage cavity, and the upper opening of the storage cavity is provided with a transport container top flange; the transport container internal partition plate, which partitions the storage cavity into a plurality of storage chambers, is disposed in the storage cavity; and the transport container top cap covers the upper opening of the storage cavity and is connected to the transport container top flange by a transport container top cap bolt; and
 a plurality of nuclear fuel storage containers, which are placed in corresponding storage chambers of the nuclear fuel transport container; wherein the locking member is disposed in the storage cavity, and is configured to lock the nuclear fuel storage containers.

2. The equipment of claim 1, wherein
the nuclear fuel storage container comprises a storage container body and a storage container top cap; the storage container body comprises a storage container frame, a storage container main body and a storage container top flange; a storage compartment is disposed inside the storage container main body, and an upper opening is disposed at a top of the storage container main body; a storage container internal partition plate, which partitions the storage compartment into a plurality of storage compartment units, is provided inside the storage compartment; the storage container frame encloses an outer side of the storage container main body; the storage container top flange is disposed at the upper opening of the storage container main body and is connected to the storage container frame; the storage container top cap covers the upper opening of the storage container main body and is connected to the storage container top flange by bolts for storage container top cap; a bottom of the storage container top cap is provided with a pressing member which is configured to press a nuclear fuel element tightly; and a top of the storage container frame is provided with a storage container lifting lug which is matched with the locking member in a locking manner.

3. The equipment of claim 2, wherein
the nuclear fuel transport container and the nuclear fuel storage container are made of steel.

4. The equipment of claim 2, wherein
the transport container side plate, the transport container bottom plate, the transport container bottom plate outer frame, the transport container top crossbeam, the transport container column and the transport container top cap are filled therein with buffered heat insulation material.

5. The equipment of claim 2, wherein
a top of the the transport container top cap is provided with a groove and transport container top cap lifting lugs are provided in the groove.

6. The equipment of claim 2, wherein
each of the transport container bottom plate outer frame and the transport container top crossbeam is provided with a plurality of transport container lock catches.

7. The equipment of claim 2, wherein,
outer surfaces of the transport container side plate and transport container bottom plate are provided with transport container reinforcing ribs.

8. The equipment of claim 1, wherein
the locking member is a storage container pressing bolt disposed at a top of the transport container internal partition plate.

9. The equipment of claim 8, wherein
the nuclear fuel transport container and the nuclear fuel storage container are made of steel.

10. The equipment of claim 8, wherein
the transport container side plate, the transport container bottom plate, the transport container bottom plate outer frame, the transport container top crossbeam, the transport container column and the transport container top cap are filled therein with buffered heat insulation material.

11. The equipment of claim 8, wherein
a top of the the transport container top cap is provided with a groove and transport container top cap lifting lugs are provided in the groove.

12. The equipment of claim 8, wherein
each of the transport container bottom plate outer frame and the transport container top crossbeam is provided with a plurality of transport container lock catches.

13. The equipment of claim 8, wherein, outer surfaces of the transport container side plate and transport container bottom plate are provided with transport container reinforcing ribs.

14. The equipment of claims 1, wherein
the nuclear fuel transport container and the nuclear fuel storage container are made of steel.

15. The equipment of claims 1, wherein
the transport container side plate, the transport container bottom plate, the transport container bottom plate outer frame, the transport container top crossbeam, the transport container column and the transport container top cap are filled therein with buffered heat insulation material.

16. The equipment of claims 1, wherein
a top of the the transport container top cap is provided with a groove and transport container top cap lifting lugs are provided in the groove.

17. The equipment of claims 1, wherein
each of the transport container bottom plate outer frame and the transport container top crossbeam is provided with a plurality of transport container lock catches.

18. The equipment of claims 1, wherein,
outer surfaces of the transport container side plate and transport container bottom plate are provided with transport container reinforcing ribs.

19. A method for transporting nuclear fuel of nuclear power plant, comprising:
loosening bolts for storage container top cap;
removing a storage container top cap from an upper opening of a nuclear fuel storage container by hoisting equipment;
loading a nuclear fuel element into a storage compartment of the nuclear fuel storage container by a loading machine;
placing the storage container top cap on the upper opening of the nuclear fuel storage container by hoisting equipment;
tightening the bolts for storage container top cap;
loosening bolts for transport container top cap;
removing a transport container top cap from an upper opening of a nuclear fuel transport container by hoisting equipment;
placing the nuclear fuel storage container into a storage cavity of the nuclear fuel transport container by hoisting equipment;
locking the nuclear fuel storage container by a locking member;
placing the transport container top cap on the upper opening of the nuclear fuel transport container by hoisting equipment; and
tightening the bolts for transport container top cap.

20. A method for transporting nuclear fuel of nuclear power plant, comprising:
loosening bolts for transport container top cap;
removing a transport container top cap from an upper opening of a nuclear fuel transport container by hoisting equipment;
releasing a locking of a nuclear fuel storage container by a locking member;
removing the nuclear fuel storage container through the upper opening of the nuclear fuel transport container by hoisting equipment;
loosening bolts for storage container top cap;
removing a storage container top cap from an upper opening of a nuclear fuel storage container by hoisting equipment;
unloading a nuclear fuel element from the nuclear fuel storage container by an unloading machine;
placing the storage container top cap on the upper opening of the nuclear fuel storage container by hoisting equipment;
tightening the bolts for storage container top cap;
placing the nuclear fuel storage container into a storage cavity of the nuclear fuel transport container by hoisting equipment;
locking the nuclear fuel storage container by the locking member;
placing the transport container top cap on the upper opening of the nuclear fuel transport container by hoisting equipment; and
tightening the bolts for transport container top cap.

* * * * *